(12) United States Patent
Erdodi et al.

(10) Patent No.: US 11,597,838 B2
(45) Date of Patent: *Mar. 7, 2023

(54) MATTED POLYAMIDE-PUD

(71) Applicant: Lubrizol Advanced Materials, Inc., Cleveland, OH (US)

(72) Inventors: Gabor Erdodi, Macedonia, OH (US); Naser Pourahmady, San Diego, CA (US); Jonathan J. Bird, Wooster, OH (US); Israel J. Skoff, Stow, OH (US); Christopher Swech, Medina, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,078

(22) Filed: May 6, 2022

(65) Prior Publication Data

US 2022/0259430 A1    Aug. 18, 2022

Related U.S. Application Data

(63) Continuation of application No. 16/607,495, filed as application No. PCT/US2018/030232 on Apr. 30, 2018, now Pat. No. 11,359,090.

(60) Provisional application No. 62/491,802, filed on Apr. 28, 2017.

(51) Int. Cl.
| | |
|---|---|
| *C08L 75/12* | (2006.01) |
| *C08G 18/34* | (2006.01) |
| *C08G 18/40* | (2006.01) |
| *C08G 18/75* | (2006.01) |
| *C08J 5/18* | (2006.01) |
| *C09D 175/12* | (2006.01) |
| *C09J 175/12* | (2006.01) |
| *C08G 18/32* | (2006.01) |
| *C08G 18/60* | (2006.01) |
| *C08G 18/64* | (2006.01) |
| *C08G 18/65* | (2006.01) |

(52) U.S. Cl.
CPC .......... *C08L 75/12* (2013.01); *C08G 18/3281* (2013.01); *C08G 18/348* (2013.01); *C08G 18/4081* (2013.01); *C08G 18/603* (2013.01); *C08G 18/6407* (2013.01); *C08G 18/6541* (2013.01); *C08G 18/758* (2013.01); *C08J 5/18* (2013.01); *C09D 175/12* (2013.01); *C09J 175/12* (2013.01); *C08J 2375/12* (2013.01); *C08J 2433/12* (2013.01); *C08J 2469/00* (2013.01); *C08L 2201/50* (2013.01); *C08L 2205/03* (2013.01)

(58) Field of Classification Search
None
See application file for complete search history.

(56) References Cited

U.S. PATENT DOCUMENTS

2008/0090956 A1* 4/2008 Munzmay .......... C08G 18/6541
528/85

* cited by examiner

*Primary Examiner* — Christopher M Rodd
(74) *Attorney, Agent, or Firm* — Samuel B. Laferty; Vincent Cortese; Michael Miller

(57) ABSTRACT

Polymers are disclosed that incorporate portions of secondary or tertiary polyamide segments connected with polyisocyanates. These polymers have enhanced matting properties. The enhanced matting properties are from creating an inherently matt surface from the polymer without the use of any separate fine particle size matting additives. Conventional matting agents such as fine particle size silica usually results in loss of physical properties such as haze development and porosity in the coating from the matting agent. Composites and hybrids of these polymers and other polyamides, polyurethane with vinyl polymers (acrylates) are also disclosed and claimed.

34 Claims, No Drawings

MATTED POLYAMIDE-PUD

This application is continuation of U.S. patent application Ser. No. 16/607,495, filed on Oct. 23, 2019, which is a national-phase filing of PCT Application No. PCT/US2018/030232, filed on Apr. 30, 2018, which claims the benefit of U.S. Provisional Application No. 62/491,802, filed on Apr. 28, 2017.

FIELD OF INVENTION

The invention relates to water borne polymer containing polyamide and multiple urethane and/or urea linkages dispersions comprising polyamide segments derived from cyclic aliphatic or aromatic primary or secondary amines reacted with some form of reactive carbonyl such as carboxylic acids. These polyamides unexpected impart a texture to the surface of coatings derived from said polymer containing polyamide and multiple urethane and/or multiple urea linkages dispersions that is characterized by a lowered gloss reading.

BACKGROUND OF THE INVENTION

In the coatings industry sometimes a high gloss very smooth coating finish is desired. At other times a matted (lower gloss) coating or ink surface is desired that reflects incident light in a variety of directions due to the coating's surface variations. A variety of mechanisms and products for imparting gloss reduction (matting) have been developed for different types of coatings (solvent based and water based). The coatings industry desires uniformity and consistent control of the extent of matting and the ability to adjust the level of matting easily at any stage of the coating manufacture and coating application processes.

Silica with controlled particle size has been used extensively in producing matte finishes. It is believed to function by the silica particles extending out of the coating surface creating high spots on the coating surface that reflect light in a variety of directions. The silica used in this application has a porous structure that increases the porosity of the finished coating (more silica, more matting, and more porosity). Porosity in a coating decreases its resistance to various liquids that might discolor the coating, blemish or soften the coating, or react unfavorably with the substrate below the coating (such as causing corrosion of metals). Silica also adds some opacity to the coating since it has a significantly different refractive index than most binders.

Applicant had two earlier applications (U.S. Pat. No. 9,527,961 and US 2016/009953) that described polyamide containing polymers and polyurethane dispersions where a high percentage of the polyamide was tertiary polyamide derived from piperazine.

SUMMARY OF THE INVENTION

This invention relates to polymer containing polyamide and multiple urethane and/or multiple urea linkages dispersions in aqueous medium (e.g., water and optional water soluble organics) containing polyamides from specific cyclic aliphatic or aromatic primary or secondary amine groups that impart low gloss (high matte) finishes to coatings applied from polymer dispersions in aqueous medium. These polyamides are useful as segments in the binder of a coating, ink, or adhesive. These polyamides may also be prepared separately from the primary polymeric binders (e.g., a second polymer), both being put in the form of a dispersion in aqueous media. The polymer containing polyamide and multiple urethane linkages and/or urea linkages can be blended with the second polymer before dispersion of the blend in aqueous medium. Or the polymer with polyamide and multiple urethane and/or multiple urea linkages and the second polymer can each be separately dispersed in aqueous medium and then the dispersed particles from each in aqueous medium can be blended together. Or these polymer with polyamide may be made as a masterbatch, optionally with a second polymer and that masterbatch can be blended with one or more other polymer dispersions to create the binder for a coating, ink or adhesive. The polymer of the binder can be thermoplastic, thermoset, or elastomeric and is generally a water-borne dispersions of those resins. The unique feature of these polymer dispersions with their specific polyamides is their ability to impart a textured surface to a final coating or ink wherein said textured surface gives a decreased gloss (increases matting) of the coating or ink finish. The amount of the polyamide in the polymers of the coating or ink affects the level of gloss reduction or matting achieved.

DETAILED DESCRIPTION OF THE INVENTION

Definitions: We will use the parentheses to designate 1) that the something is optionally present such that monomer(s) means monomer or monomers or (meth)acrylate means methacrylate or acrylate, 2) to qualify or further define a previously mentioned term, or 3) to list narrower embodiments.

The terms "hydrocarbyl" or "hydrocarbylene" denotes a group having a carbon atom directly attached to the remainder of the molecule and having a hydrocarbon or predominantly hydrocarbon character within the context of this invention. Such groups include purely hydrocarbon groups; that is, aliphatic, and optionally groups containing non-hydrocarbon substituents (containing hetero atoms) which do not alter the predominantly hydrocarbon character of the group. Examples of non-hydrocarbon substituents include hydroxy, nitro, cyano (cyano group attaches via C atom and so does the acyl), alkoxy, acyl groups, etc. Suitable hetero atoms will be apparent to those skilled in the art and include, for example, nitrogen, oxygen and sulphur.

A first portion of this invention is the generation of polyamide segments from a cyclic aliphatic or aromatic primary or secondary diamine type component reacted with some form of reactive carbonyl such as carboxylic acid, often a dicarboxylic acid, hydroxycarboxylic acid or lactone from hydroxycarboxylic acid. In one preferred embodiment, both nitrogen atoms are attached to the cyclic or aromatic ring with no intervening atoms between the nitrogen and the ring. This reaction of the amine with a carboxylic acid generates water as a byproduct (or in the case of a lactone, a hydroxyl group) and amide linkages. The polyamide segment formation can be promoted by removing the water byproduct. Generally, a polyamide number average molecular weight from about 500 to 5,000 g/mole, more preferably from about 800 or 1000 to 3000 g/mole has been easily processable into the final binder by this technology. Applicant is using polyamide to mean two or more amide linkages in the oligomer or polymer. These polyamides may initially be amine, hydroxyl, or carboxylic acid terminated. Generally, it is desirable to form hydroxyl end groups as these are conventional terminal groups for precursors to polyurethanes.

Many of the examples use a slight excess of the diamine relative to the moles of reactive carbonyl and/or carboxylic functional groups and react to a very low acid number, consuming substantially all of the available carboxylic groups. Adjusting the stoichiometry of reactive amine and acid groups can help control the molecular weight and the predominant terminal groups. In some embodiments, the only carboxylic acid group is a hydroxycarboxylic acid or lactone therefrom and this results in a hydroxyl terminated polyamide that forms a polyurethane when reacted with a polyisocyanate.

In other embodiments, the amine repeating unit is first reacted with a dicarboxylic acid to create an amine terminated polyamide and then that polyamide is chain extended with a lactone polymerization on the end of the amine terminated polyamide. Other reactants (e.g., trifunctional amines or trifunctional carboxylic acids or monofunctional amines or monofunctional carboxylic acids) or impurities can be included in the polyamide formation provided that they are used in small amounts relative to the required reactants and don't unduly increase or decrease the molecular weights of the reaction products.

The preferred cyclic aliphatic or aromatic and primary or secondary diamines reactants are the following Formulas Ib through IVb.

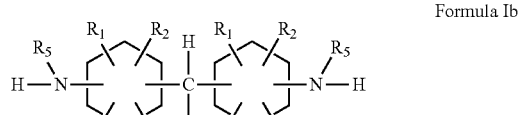

Formula Ib

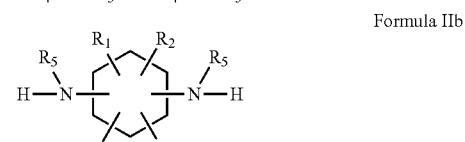

Formula IIb

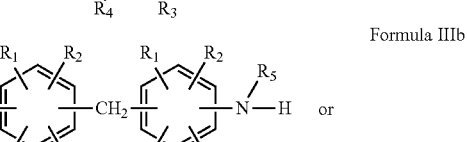

Formula IIIb

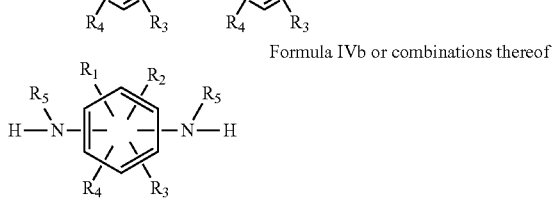

Formula IVb or combinations thereof

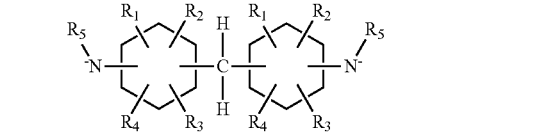

wherein $R_1$ to $R_5$ are independently selected from H or a $C_1$ to $C_4$ linear or branched alkyl group, and in one embodiment, desirably at least 80, 90 or 95 wt. % of the total $R_5$ groups in the amine repeating units is H.

The preferred cyclic aliphatic or aromatic and primary or secondary diamines repeating units are Formula I to IV.

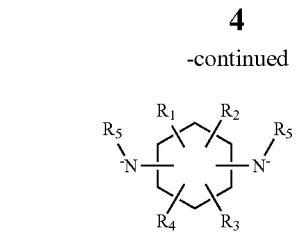

Formula I

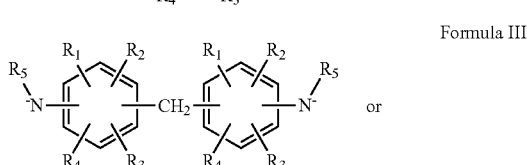

Formula II

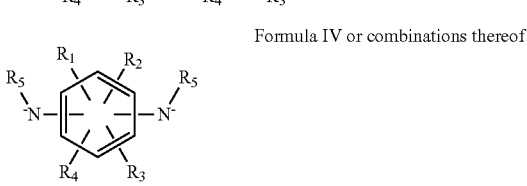

Formula III

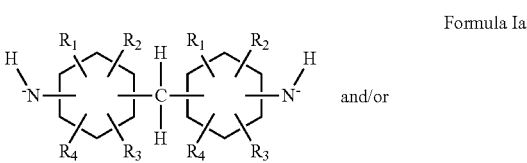

Formula IV or combinations thereof wherein $R_1$ to $R_5$ are independently selected from H or a $C_1$ to $C_4$ linear or branched alkyl group, and in one embodiment, desirably at least 80, 90 or 95 wt. % of the total $R_5$ groups in the amine repeating units is H and at least 80, 90 or 95 wt. % of the cyclic aliphatic or aromatic portion of the molecule are cyclic aliphatic such that Formula 1 and II (preferred) become Formula Ia and Formula IIa as shown here:

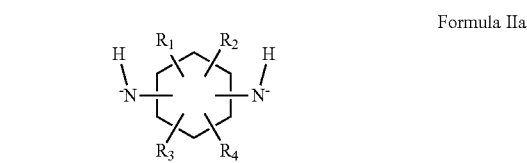

Formula Ia and/or

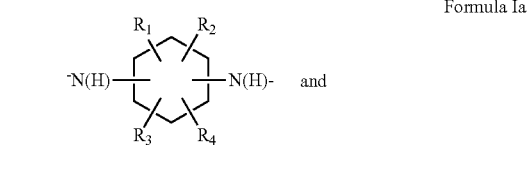

Formula IIa wherein $R_1$ through $R_4$ are individually a H or a $C_1$ to $C_4$ alkyl group. In one embodiment, at least 60, 70 or 80 of the $R_1$, $R_2$, $R_3$, and $R_4$ groups of the diamine of Formulas Ib-IVb, Formulas I-IV, and Formulas used to make the polyamide or the amine repeating units of the polyamide are hydrogen. In one embodiment, desirably at least 80, 90, 95, 99 or 100 mole % of the $R_5$ groups are hydrogen resulting in primary diamines. These primary amines when reacted into a polyamide generate the repeating unit of

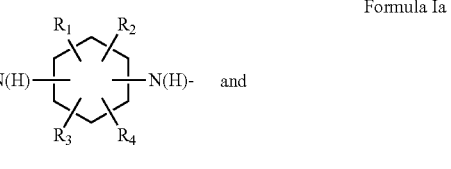

Formula Ia and

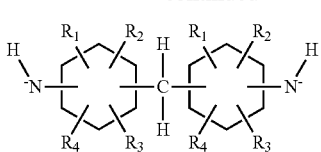

Formula IIa wherein $R_1$ to $R_4$ are as described above. Examples of the aliphatic primary cyclic diamines include 1,3-diamino cyclohexyl and the 4,4'-methylenebis(cyclohexylamine) optionally mono or dialkyl (methyl preferred) substituted as taught above. While cyclic aliphatic diamines and cyclic aromatic diamines are shown, it is believed that the aromatic diamines may generate yellow color in polymeric coatings and inks upon exposure to light sources. Thus, the primary aliphatic and/or secondary diamines are slightly preferred.

The amount of primary and/or secondary diamine with particular aliphatic cyclic or aromatic structure of Formulas I-IV with the amine groups attached directly to a carbon atom in the cyclic structure incorporated as an amine compound backbone is from about 1 or 2 to about 20 or 25 wt. % of the total polymers in said polymer dispersion, more desirably from 4 to 15, and preferably from 6 to 15 based on the total amount of polymer in the polyurethane dispersion (i.e., generally coating wt. less aqueous phase, filler, and pigment wt.).

In one embodiment, the diacids reacted with the aliphatic cyclic diamine component are $C_4$ to $C_{50\ or\ 60}$ dicarboxylic acids including $C_{10}$ to $C_{40}$ dicarboxylic acids and dimer fatty acids. Particularly preferred larger diacids include sebacic acid, dodecanedoic acid and dimer acids. The repeat unit from them would have the structure

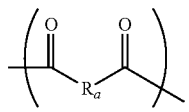

wherein Ra is a hydrocarbyl group of $C_2$ to $C_{48\ or\ 58}$ more preferable of $C_8$ to $C_{38}$. Preferred diacids include sebacic acids and $C_{10}$ to $C_{40}$ aliphatic diacids. Dimer and trimer fatty acids are very useful in this application.

The terms dimer fatty acids (also referred to as dimer diacids or dimer fatty diacid) and trimer fatty acids are well known in the art, and refers to the dimerization or timerization products of mono- or polyunsaturated fatty acids and/or esters thereof. They are prepared by polymerizing fatty acids under pressure, and then removing most of the unreacted fatty acid starting materials by distillation. The final product usually contains some small amounts of mono fatty acid and trimer fatty acids, but is mostly made up of dimer fatty acids.

The dimer and trimer fatty acids used in the present invention are preferably derived from the dimerization products of $C_{10}$ to $C_{30}$ fatty acids, more preferably $C_{12}$ to $C_{24}$ fatty acids, particularly $C_{14}$ to $C_{22}$ fatty acids, further preferably $C_{16}$ to $C_{20}$ fatty acids, and especially $C_{18}$ fatty acids. Thus, the resulting dimer fatty acids preferably comprise carbon atoms per molecule in the range from 20 to 60, more preferably 24 to 48, particularly 28 to 44, further preferably 32 to 42, and especially 36 carbon atoms. Preferably, the fatty acids starting materials used to make the dimer are linear monounsaturated fatty acids.

The molecular weight (weight average) of the dimer fatty acid is preferably in the range from 450 to 690, more preferably 500 to 640, particularly 530 to 610, and especially 550 to 590 g/mole. The molecular weight (weight average) of the trimer fatty acids is preferably in the range from 750 to 950, more preferably 790 to 910, particularly 810 to 890, and especially 830 to 870. In addition to the dimer fatty acids, dimerization usually results in varying amounts of trimer fatty acids (so-called "trimer"), oligomeric fatty acids, and residues of monomeric fatty acids (so-called "monomer"), or esters thereof, being present. They are available from Croda under the Pripol™ trademark or Arizona Chemical under the Unidyme™ trademark.

The dimer fatty acid used in the present invention preferably may have a dimer fatty acid (or dimer) content of greater than 60 wt. %, more preferably greater than 70 wt. %, particularly greater than 80 wt. %, and especially greater than 85 wt. %. In addition, particularly preferred dimer fatty acids may have a trimer fatty acid (or trimer) content of less than 40 wt. %, more preferably less than 30 wt. %, particularly less than 20 wt. %, and especially less than 15 wt. %. Furthermore, the dimer and or trimer fatty acid preferably comprises less than 10 wt. %, more preferably less than 6 wt. %, particularly less than 4 wt. %, and especially less than 3.5 wt. % of mono fatty monoacid (or monomer). All of the above weight percentage values are based on the total weight of polymerized fatty acids and mono fatty acids present.

Preferred hydroxycarboxylic acids with the formula HO—C(=O)—$R_f$—O—H and cyclic lactones therefrom of the formula

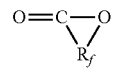

include linear, branched and cyclic $R_f$ structures with the above formula—with 2 to 15 carbon atoms, more preferably 2 to 5 carbon atoms (where $R_f$ has from 1 to 14 carbon atoms, more preferably 1 to 4 carbon atoms). Various nonsubstituted and alkyl substituted caprolactones and valerolactones are preferred. Both the hydroxycarboxylic acid and the lactones therefrom result in a repeating unit of the structure —(C(=O)—$R_f$—O—)— with the generation of one mole of water, if starting with hydroxycarboxylic acid.

As indicated in the summary of the invention the hydroxycarboxylic acid or lactones therefrom can be used with or without the dicarboxylic acids (and vice versa) to generate amide linkages and using the lactone or hydroxycarboxylic acid to chain extend polyamides of the invention with polyester repeating units. When the polyamide is chain extended with polyester repeating units from the hydroxycarboxylic acid or lactones therefrom, the amount of polyester repeating units is desirably from about 1 to about 75 wt. % of the polymer of the polyurethane dispersion.

The polyamide repeating structure of one mole of diacid and one mole of the specified primary diamine would look like

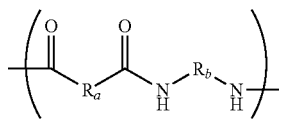

wherein the primary diamine component would look like

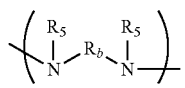

and the $R_b$ of the diamine would look like the structure selected from the group of

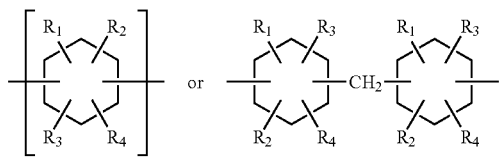

wherein $R_1$ through $R_4$ are as described above. If the amine repeating unit was of the secondary amine type with a non-hydrogen $R_5$ group, the structure would have the $R_5$ group on the nitrogen of the amide linkages. These repeating units would be the most common in the polyamide, but there could be monofunctional amide forming reactants or trifunctional amide forming reactants present, provided that at least 50, 70, 80, 90 or 95 mole percent of the amine reactants were difunctional.

A second embodiment of the invention is a) incorporating or blending a second, third or more polymer(s) into a) the polymer containing polyamide and multiple urethane linkages and/or multiple urea linkages to be dispersed into aqueous medium, or b) making separate dispersions of the polymer containing polyamide and multiple urethane and/or multiple urea linkages and a second, third or more polymer(s) in aqueous medium that are then blended as dispersions to form a blend. These two procedures are desirable as the amount of the polymer containing polyamide and multiple urethane linkages and/or multiple urea linkages with repeating units of the Formulas I to IV controls the relative amount of matting or gloss reduction in the final film of the polymer. Blending two polymers, one with the polyamide having repeating units of Formulas I to IV with a polymer(s) that substantially lack repeating units of Formulas I to IV, allows control of the level of matting or gloss reduction. Combinations of a) and b) can be used where one second polymer is blended with the polymer containing polyamide and multiple urethane and/or multiple urea linkages prior to dispersion in aqueous medium and a third polymer is made into a separate dispersion in aqueous medium and later blend with the polymer containing polyamide and multiple urethane and/or multiple urea linkages and second polymer that were blended before dispersion in aqueous medium. We generally use the term incorporating when talking about polymer segments in the polyurethane to mean covalently bonded into the polyurethane. We generally use the term blended to mean forming a physical blend.

A variation of the above embodiment of the invention (optionally used in combination) includes the option of incorporating the polymer containing polyamide and multiple urethane and/or multiple urea linkages into a larger polyurethane structure by polymerizing an a) ester forming monomer(s) and/or b) other polyamide forming monomer(s) onto the polyamide chain ends or coupling the polyamide to other large oligomer or polymeric species such as with reactions of Zerewitinoff reactive groups on the oligomeric or polymeric species with polyisocyanates.

In one embodiment, a polyester segment is added via ester polymerization to one or both ends of the polyamide polymer. This may be accomplished by adding polyester forming monomer(s) to the polyamide, optionally catalyzing the ester polymerization, and stirring and heating the reactants. In one embodiment poly (caprolactone) can be added via ester polymerization to one or both ends of the polyamide. The molecular weight of the polyester segments can be controlled by the amount of polyester forming reactants added relative to the number of polyamide segments and the reaction conditions. Alternatively, dicarboxylic acid and dihydroxyl compounds can be polymerized in the presence of the polyamide and partially or fully coupled to said polyamide by conventional condensation polymerization.

Alternatively from polymerizing a different polymer structure directly from the monomer(s) onto or with said polyamide, one can use polyisocyanate reactants to couple said polyamide from cyclic aliphatic or aromatic and primary or secondary polyamines to other monomers, or oligomeric or polymeric species. For example, polyester, polyether, or polycarbonate segments having about two terminal Zerewitinoff groups per segments can be coupled with polyisocyanates onto the polyamide segments that provide matting. The polyether, polyester, polycarbonate segments desirably have about two Zerewitinoff groups per segment as this is thought to result in linear polymers when the polyisocyanate has about two reactive isocyanate groups per polyisocyanate. It is known that a little monofunctional reactant or trifunctional reactant can be used and the results are similar (especially if the amount of monofunctional and trifunctional reactants are about equal in moles such that the average functionality remains about 2). However, if too much monofunctional or trifunctional reactants are used, the product can be too low or too high of molecular weight. Zerewitinoff groups are well known and are defined as active hydrogen containing groups (such as amine or hydroxyl, which are the primary Zerewitinoff groups of this disclosure) that are reactive with isocyanates to form covalent chemical bonds called urea or urethane linkages. The bond is between a hydroxyl and isocyanate group when a urethane linkage is formed and if the bond is between an amine group and an isocyanate group, then a urea linkage is formed. In one preferred embodiment, the polyester, polyether, polycarbonate segments with Zerewitinoff terminal groups have a number average molecular weight from about 500 to about 5,000 g/mole.

This number average molecular weight can be calculated if the polyester, polyether, polycarbonate is difunctional and one knows the number and type of functional groups per polymer segment by simply dividing the grams of segments in the sample by (0.5 times the number of functional groups in moles in the sample). This number average molecular weight can also be determined by gel permeation chromatography (gpc) in a good solvent like tetrahydrofuran and calibrating the gpc columns with a series of commercially available known molecular polystyrene calibration samples. Generally, the two methods give very similar molecular weights.

A series of polyamide oligomers from conventional difunctional acids and cycloaliphatic primary diamines were made. The initial oligomers may comprise amine terminal groups, carboxyl terminal groups, or other terminal groups derived from reacting the terminal amine or carboxyl groups with other reactants. The presence of strong hydrogen bond in these structures makes them less deformable during film formation, and while not wishing to be bound by theory, seems to facilitate formation of the desired textured coating surfaces with high matt/low gloss finishes when the films form from the aqueous dispersions. This occurs even at low molecular-weight for the polyamide from the particular aliphatic or aromatic cyclic primary or secondary diamines.

Many of the oligomers, telechelics, and polymers of this specification are made by condensation reactions of reactive groups on desired monocarboxylic acid or dicarboxylic acid monomers and the cycloaliphatic and/or aromatic primary or secondary diamine monomer(s). Triamine monomers and tricarboxylic acids are less desirable for this as they are thought to produce highly branched less deformable polyamides. These condensation reactions between carboxylic acid groups and amine or hydroxyl groups are well known and are driven by the removal of water and or catalysts. The formation of amides from the reaction of carboxylic acid groups and amine groups can be catalyzed by boric acid, boric acid esters, boranes, phosphorous acid, phosphates, phosphate esters, amines, acids, bases, silicates, and silsesquioxanes. Additional catalysts, conditions, etc. are available in textbooks such as "Comprehensive Organic Transformations" by Larock.

Two earlier applications (U.S. Pat. No. 9,527,961 and US 2016/0009953) described tertiary polyamide containing polymers and polyurethane dispersions where a high percentage of the amide linkages were tertiary amide linkages derived from piperazine and other secondary diamines. These polymers were not self-matting or low gloss in coating applications. In one embodiment of this disclosure, it is desirable to blend (prior to or after dispersing in aqueous medium) or mutually incorporate the matting polymer containing polyamide and multiple urethane linkages and/or multiple urea linkages of this disclosure with those earlier tertiary polyamide containing polymers. This would impart variable levels of flatting or gloss reduction into those polyamides. In one embodiment, it is desirable to include 5-85 wt. %, more desirably at least 10, 15, 20 or 25 wt. % and up to about 65 wt. % of polyamides (based on the combined weight of the polymer(s) in the polyamide containing polyurethane dispersion in aqueous medium) where the polyamides are characterized as at least 75 wt. % amide repeat units and at least 60, 75 or 80 mole % of the amide linkages are tertiary amide linkages and at least 60, 70 or 80 wt. % of the amine groups in the amide repeat units are based on cyclic diamines where the nitrogen atoms are part of the ring and having 3 or 4 to 10 carbon atoms such as piperazine or a mono or dialkyl ($C_1$-$C_4$) substituted piperazine.

The tertiary polyamides of those earlier disclosures had lower minimum film formation temperature (generally from about −10 to about 20, 25 or 30° C.) than most polyamides from primary amines, such that they could form films at or near room temperature (about 20-25° C.) without a lot of plasticizer, solvent, or coalescing agents). The tertiary amide linkage of those disclosures were formed from the covalent bond between a secondary amine and a carboxylic acid group resulting in a tertiary amide linkage (an important aspect of those earlier disclosures to get lower minimum film formation temperature). Primary amines react with carboxylic acid type groups to form secondary amides, which generally have higher minimum film formation temperatures, other factors being held the same.

Sometimes it is desirable to convert a carboxylic acid terminated polyamide segment to a hydroxyl (Zerewitinoff group) by reacting with an aminoalcohol, such as N-methylaminoethanol or $HN(R^\alpha)(R^\beta)$ where $R^\alpha$ is a $C_1$ to $C_4$ alkyl group and $R^\beta$ comprises an alcohol group and a $C_2$ to $C_{12}$ alkylene group, alternatively $R^\alpha$ and $R^\beta$ can be interconnected to form a $C_3$ to $C_{16}$ alkylene group including a cyclic structure and pendant hydroxyl group (such as in 2-hydroxymethyl piperidine), either of which can create a polyamide with terminal hydroxyl groups. The reaction of the secondary amine (as opposed to the hydroxyl group) with the carboxylic acid can be favored by using a 100% molar excess of the amino alcohol and conducting the reaction at 160° C.+/−10 or 20° C. The excess amino alcohol can be removed by distillation after reaction.

In one embodiment the polymer containing polyamide and multiple urethane and/or multiple urea linkages dispersions are copolymerized with or blended with other polyamide containing polymer dispersions (described as earlier tertiary polyamides) such as described in the next couple of paragraphs. Preferred dicarboxylic acids for forming the earlier tertiary polyamides are where the alkylene portion of the dicarboxylic acid is a cyclic, linear, or branched (optionally including aromatic groups) alkylene of 2 to 36 carbon atoms, optionally including up to 1 heteroatom per 3 or 10 carbon atoms, more preferably from 4, 8 or 12 to 36 carbon atoms (the diacid would include 2 more carbon atoms than the alkylene portion). These include dimer fatty acids, hydrogenated dimer acid, sebacic acid, etc. Generally, we prefer diacids with larger alkylene groups as this generally provides polyamide repeat units with lower minimum film formation temperatures.

Preferred diamines for forming the tertiary polyamides include those with from 6 to 60 carbon atoms, more desirably 6 to 20, and preferably 6 or 12, or 13 to 15, 17 or 20 carbon atoms, optionally including 1 heteroatom (besides the two nitrogen atoms) for each 3 or 10 carbon atoms of the diamine and optionally including a variety of cyclic, aromatic or heterocyclic groups providing that one or both of the amine groups are primary amines, a preferred formula is

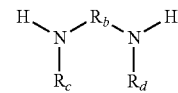

and a $R_b$ is a direct bond or a linear or branched (optionally being or including cyclic, heterocyclic, or aromatic portion(s)) alkylene group (optionally containing up to 1 or 3 heteroatoms per 10 carbon atoms of the diamine) of 2 to 36 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or optionally $R_c$ and $R_d$ connect together to form a single linear or branched alkylene group of 1 to 8 carbon atoms or optionally with one of $R_c$ and $R_d$ is connected to $R_b$ at a carbon atom, and more desirably where $R_c$ and $R_d$ connect together and combined are from 1 or 2 to 4 carbon atoms.

In one embodiment of the prior disclosures about tertiary polyamides, desirably at least 50 wt. %, more desirably at least 60, 70, 80 or 90 wt. % of said polyamide oligomer or telechelic polyamide comprise repeat units from diacids and diamines of the structure of the repeat unit being

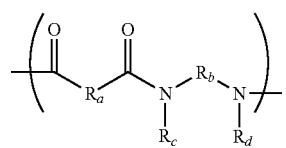

wherein $R_a$ is the alkylene portion of the dicarboxylic acid and is a cyclic, linear, or branched (optionally including aromatic groups) alkylene of 2 to 36 carbon atoms, optionally including up to 1 heteroatom per 3 or 10 carbon atoms of the diacid, more preferably from 4 to 36 carbon atoms (the diacid version would include 2 more carbon atoms than the alkylene portion of the diacid) and wherein $R_b$ is according to the formula

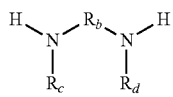

wherein $R_b$ is from 2 to 36 or 60 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, and more desirably $R_c$ and $R_d$ being connected together and being an alkylene group of 1 or 2 to 4 carbon atoms.

During the reaction of the polyamides of this disclosure with the polyisocyanates to form the polyamide containing polyurethane, one can have other species present with Zerewitinoff groups to co-react into the resulting polyurethane. These can be low molecular weight species (e.g., less than 500 g/mole diols or diamines) or higher molecular weight species (e.g., 500 to 5,000 g/mole oligomers that are added to form the high or low Tg phases in the resulting urethane polymer). Generally, if one wants a low viscosity prepolymer to make a polymer dispersion in aqueous medium, one only reacts the components with a stoichiometry imbalance between the reactive groups to create moderate molecular weight species called a prepolymer with the functional group present in excess being the dominant terminus of most prepolymer units. This is usually accomplished by keeping the stoichiometry of the isocyanate groups to Zerewitinoff groups away from the 1:1 ratio (such that prepolymers of limited molecular weight are produced because of the excess of isocyanate or Zerewitinoff groups that serve as terminal groups). The molecular weight of the prepolymer is kept fairly low (5,000 g/mole to 100,000 g/mole) so that the prepolymer is a liquid at room temperature or slightly above room temperature (generally up to about 80° C.). This low viscosity at 80° C. or below facilitates mixing and shearing of the liquid prepolymer into a finely dispersed colloidal prepolymer phase stable in water. Often, an excess of isocyanate groups are used so that the prepolymer is isocyanate terminated.

The molecular weight of the urethane prepolymer can be increased (or it is sometimes referred to as chain extending the prepolymer into a urethane polymer) after the dispersion of prepolymer is made. This can be done by adding to the dispersion low molecular weight species such as diols, triols, tetrols, or diamines, triamines or tetraamines that can react with isocyanate terminated prepolymers linking them into higher molecular weight species. Isocyanate groups on the prepolymer can also react with water from the continuous phase to generate $CO_2$ gas and terminal amine groups on some of the prepolymer. The amine groups on some of the prepolymer can then react with isocyanate groups on other prepolymers and chain extend both species. While the following paragraphs describe dispersing groups that can be incorporated into the prepolymer/polymer, it is also possible to utilize dispersants and surfactants of the anionic, cationic, nonionic, or zwitterionic type or mixtures thereof to facilitate the dispersion of the prepolymer/polymer in a continuous media.

Surface active dispersing species such as anionic, cationic, nonionic, or zwitterionic species are desirably added to the prepolymer (or polymer) if it is desired to disperse the prepolymer (or polymer) in a continuous aqueous phase. These dispersing species help to provide colloidal stabilization to the dispersed phase. If surface active dispersing groups are to be incorporated into the polymer, it is desirable to include them in the reaction of the polyamide oligomer or other sources of Zerewitinoff reactive groups (e.g., during the urethane prepolymer preparation). Dispersing groups that have Zerewitinoff active groups, which react with isocyanate groups to form urea or urethane linkages, are particularly preferred for this purpose.

If one wants to form a polyurethane dispersion in aqueous medium, it is desirable to include a water dispersing component either as a surfactant/emulsifier or as a water dispersing group that can be incorporated into the polyurethane itself. Therefore it is often desirable to include at least one water-dispersibility enhancing compound, i.e., a monomer with a dispersing functionality, which has at least one, hydrophilic, ionic or potentially ionic group in the reactants for the urethane forming polymers and prepolymers of this invention to assist dispersion of the polymer/prepolymer in aqueous medium. Typically, this is done by incorporating (via one or two Zerewitinoff groups on the compound) a compound bearing at least one hydrophilic group or a group that can be made hydrophilic, e.g., by chemical modifications such as neutralization, into the polymer/prepolymer chain. These compounds may be of a nonionic, anionic, cationic or zwitterionic nature or the combination thereof. For example, anionic groups such as carboxylic acid groups can be incorporated into the prepolymer and subsequently ionized by a salt-forming compound, such as ammonium hydroxide or a tertiary amine defined more fully hereinafter. Anionically dispersible urethane prepolymers/polyurethanes based on carboxylic acid groups generally have an acid number from about 1 to about 60 mgKOH/gram, typically 1 to about 40, or even 10 to 35 or 12 to 30 or 14 to 25 mg KOH/gram. Other water-dispersibility enhancing compounds can also be reacted into the urethane prepolymer backbone through urethane linkages or urea linkages, including lateral or terminal hydrophilic ethylene oxide or ureido units.

Water dispersibility enhancing compounds of particular interest are those which can incorporate weak carboxyl groups into the prepolymer. Normally, they are derived from hydroxy-carboxylic acids having the general formula $(HO)_xQ(COOH)_y$, wherein Q is a straight or branched hydrocarbon radical containing 1 to 12 carbon atoms, and x and y are 1 to 3. Examples of such hydroxy-carboxylic acids include dimethylol propanoic acid, dimethylol butanoic acid, citric acid, tartaric acid, glycolic acid, lactic acid, malic acid, dihydroxymalic acid, dihydroxytartaric acid, and the like, and mixtures thereof. Dihydroxy-carboxylic acids are more preferred with dimethylol propanoic acid and dimethylol butanoic acid being most preferred.

Another group of water-dispersibility enhancing compounds of particular interest are side chain hydrophilic monomers. Some examples include alkylene oxide polymers and copolymers in which the alkylene oxide groups have from 2-10 carbon atoms as shown, for example, in U.S. Pat. No. 6,897,281, the disclosure of which is incorporated herein by reference. There are commercially available polyethers with two terminal hydroxyl groups near one end of the polyether that can be incorporated as nonionic dispersing moieties into urethanes and urethane prepolymers. These have a significant portion of the polyether extending in a tethered fashion from those two points of attachment to the urethane at one end the polyether. These include Tegomer® D3403 used in U.S. Pat. No. 6,897,381 and Ymer™ N-120 from Perstop.

Water dispersibility enhancing compounds can impart cationic nature onto polyurethane. Cationic polyurethanes contain cationic centers built into or attached to the backbone. Such cationic centers include ammonium, phosphonium and sulfonium groups. These groups can be polymerized into the backbone in the ionic form or, optionally, they can be generated by post-neutralization or post-quaternization of corresponding nitrogen, phosphorous, or sulfur moieties. The combination of all of the above groups can be used as well as their combination with nonionic stabilization. Examples of amines include N-methyldiethanol amine and aminoalcohols available from Huntsman under Jeffcat® trade name such as DPA, ZF-10, Z-110, ZR-50 and alike. They can make salts with virtually any acid. Examples of acid include hydrochloric, sulfuric, acetic, phosphoric, nitric, perchloric, citric, tartaric, chloroacetic, acrylic, methacrylic, itaconic, maleic acids, 2-carboxyethyl acrylate and other. Quaternizing agents include methyl chloride, ethyl chloride, alkyl halides, benzyl chloride, methyl bromide, ethyl bromide, benzyl bromide, dimethyl sulfate, diethyl sulfate, chloroacetic, acids and alike. Examples of quaternized diols include dimethyldiethanolammonium chloride and N,N-dimethyl-bis(hydroxyethyl) quaternary ammonium methane sulfonate.

Other suitable water-dispersibility enhancing compounds include thioglycolic acid, 2,6-dihydroxybenzoic acid, sulfoisophthalic acid, polyethylene glycol, and the like, and mixtures thereof.

Although the use of water-dispersibility enhancing compounds is preferred, dispersions of the present inventions can be prepared without them by using high-shear dispersing methods and stabilizing by surfactants.

Polyisocyanate

Suitable polyisocyanates have an average of about two or more isocyanate groups, preferably an average of about two to about four isocyanate groups per molecule and include aliphatic, cycloaliphatic, araliphatic, aromatic, and heterocyclic polyisocyanates, as well as products of their oligomerization, used alone or in mixtures of two or more. Diisocyanates are more preferred. Polyisocyanates can have the formula

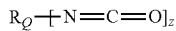

wherein $R_Q$ is a hydrocarbylene group of from 5 to 20 carbon atoms, optionally including one or more cyclic aliphatic structure or one or more aromatic ring and Z is from 1 to 4 more desirably from 1 to 3 and preferably on average are predominately 2.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl) cyclohexane, and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include 4,4'-diphenylmethylene diisocyanate, toluene diisocyanate, their isomers, naphthalene diisocyanate, and the like. Preferred aromatic polyisocyanates include 4,4'-diphenylmethylene diisocyanate and toluene diisocyanate.

Examples of suitable heterocyclic isocyanates include 5,5'-methylenebisfurfuryl isocyanate and 5,5'-isopropylidenebisfurfuryl isocyanate.

Conventional Blends with Other Polymers

The polymer containing polyamide and multiple urethane and/or multiple urea linkages formed into a dispersions of this invention can be combined with compatible polymers (i.e., a second polymer) and/or polymer dispersions by methods well known to those skilled in the art. Generally the second polymer can be distinguished from the polymer containing polyamide and multiple urethane and/or urea linkages of the dispersion because it will not be covalently bonded into said polymer containing polyamide and multiple urethane and/or multiple urea linkages and/or it will have less than the specified amounts of amine repeating units of Formula I and/or II that define the unique polymer of this disclosure. Such polymers, polymer solutions, and dispersions include those described in A. S. Teot. "Resins, Water-Soluble" in: Kirk-Othmer Encyclopedia of Chemical Technology. John Wiley & Sons. 3rd Edn., Vol. 20, H. F. Mark et al. Eds., pp. 207-230 (1982).

Composite Polymer Compositions (e.g., Polyurea/Urethane with Free Radically Polymerizable Monomers) Providing Better Interpenetration of Phases In one embodiment, one can use ethylenically unsaturated monomer(s) as a solvent to reduce the viscosity of the prepolymer during preparation and dispersion of the prepolymer or polymer containing polyamide and multiple urethane and/or multiple urea linkages and subsequently polymerize the unsaturated monomer(s) to form a polymer. Ethylenically unsaturated monomers and other free radically polymerizable monomers can be polymerized by conventional free radical sources to form a polymer within the polymer containing polyamide and multiple urethane and/or multiple urea linkages particle to form a composite polymer with the polymer containing polyamide and multiple urethane and/or multiple urea linkages of the dispersion. Vinyl polymers is a generic term for polymers derived from substantial portions of unsaturated monomers or polymers derived from those monomers. Acrylic, often considered a subset of vinyl, will refer to acrylic acid, acrylates, being esters of acrylic acid, and alkacrylates, such as methacrylates and ethacrylates, and polymers therefrom. Various styrene and alkyl substituted styrene type monomers, including divinyl benzene, (meth)acrylonitrile, vinyl esters such as vinyl acetate, unsaturated amides such as acrylamides, dienes of 4 to 6 carbon atoms, vinyl monomers with dispersing moieties thereon such as AMPs monomer (2-acrylamido-2-methylpropane sulfonic acid) and other vinyl monomers readily copolymerize with acrylic monomers. Additional free-radically polymerizable material, e.g., other unsaturated monomers, may be added to the vinyl or acrylic monomers to copolymerize. These other monomers can be monomers that technically are not ethylenically unsaturated such as maleic anhydride, maleic acid, and other monomers where the carbon-carbon double bond is nearly as reactive (and copolymerizable with) as a ethylenically unsaturated monomers. Dienes are considered ethylenically unsaturated and copolymerize with both the broad category of vinyl monomers and narrow category of acrylic monomers.

The polymerization within the polyurethane particles can be done by forming the aqueous dispersions of polymer containing polyamide and multiple urethane and/or urea linkages composite and then polymerizing additional monomers by emulsion or suspension polymerization in the presence of these dispersions. Another way of making composite polymers is to include ethylenically unsaturated monomers in the polymer containing polyamide and multiple urethane and/or urea linkages in prepolymer form, e.g., either with the reactants to form the prepolymer and/or any time before the polyurethane prepolymer is dispersed, and cause these monomer to polymerize before, during and/or after the prepolymer is dispersed in aqueous medium. In one embodiment, the weight percent of polymer(s) from free radically polymerizable monomers (or polymer therefrom) based on 100 parts of combined polymer containing polyamide and multiple urethane and/or multiple urea linkages and free radically polymerizable monomers and any additional blended or incorporated polymers will be at least 1, 5, or 10 weight percent and desirably up to 30, 40 or 50 weight percent of the combined polymers in the polymer containing polyamide and multiple urethane and/or multiple urea linkages dispersion.

In one approach, the free radically polymerizable monomers (ethylenically unsaturated monomers) act as a diluent (or plasticizer) during prepolymer formation. Composites of polymer containing polyamide and multiple urethane and/or multiple urea linkages of this invention with and without free radically polymerizable monomers (e.g., acrylics) or their polymer can be made by any of these approaches.

Broadened Definition of Composite and/or Hybrid Polymer in Dispersion in Aqueous Medium Composites (also known as hybrid compositions) can allow one to adjust the weight percentage of polyamide repeat units relative to other repeat units (e.g., optionally polyether, polycarbonate, polyester segments, polysiloxane, etc.) in the polymer containing polyamide and multiple urethane and/or urea linkages to optimize the matting effect or gloss readings. Thus this technology provides several ways to independently control the amount of polyamide in the composite polyurethane particles, which can have effects on the polarity or hydrogen bonding of the composite particles, the surface tension of the composite particles, and/or the modulus, tensile strength, etc. of the composite polymer at a particular key temperature.

By the term composite and/or hybrid, we intend to include a variety of mixtures of other polymers with a polyamide rich polymer type, such as a polymer containing polyamide and multiple urethane and/or multiple urea linkages. The polymers that contain polyamide segments may have other comonomers or comonomer segments linked directly or indirectly to the polyamide segments. These comonomers can include things like polyethers, polyesters, polycarbonates, polysiloxanes, etc. The composite and/or hybrid polymers of the composite and/or hybrid dispersions have approximately the same particle size ranges as disclosed for polyurethane dispersions in water.

The composite and/or hybrid polymer dispersions may have within the polymer anionic, nonionic, or zwitterionic colloidal stabilizing groups as earlier disclosed.

Water can be present in amounts from about 10, 20 or 30 weight percent to about 70, 80 or 90 wt. % of the polymer containing polyamide and multiple urethane and/or urea linkages in the form of a dispersion in aqueous media. Typically, lower water content saves on shipping costs for the same amount of polymer but viscosity of the dispersions tend to rise when the water content is minimized.

In one embodiment, it is desirable that the polymer containing polyamide and multiple urethane and/or multiple urea linkages or one of the second or third polymers therein be partially crosslinked to increase the physical properties of the polymer such as tensile strength and modulus. This can be achieved by adding a variety of crosslinking functionality to polymers in the dispersion or adding a separate crosslinking component to polymer containing polyamide and multiple urethane and/or multiple urea linkages in the form of a dispersion. The crosslinking components can include polyisocyanate, blocked polyisocyanate, aziridines, ketone-hydrazine crosslinking, etc. The polyisocyanates, blocked polyisocyanate, and ketone-hydrazine crosslinking are each preferred types.

Reactive crosslinking moieties of the blocked isocyanate (e.g., MEKO) or 1,3-dicarbonyl compound type (e.g., DEM) allow for delivery of a two-component performance by a one-component system. Several types of compounds can be employed as blocking (a.k.a. protecting or masking) agents to provide crosslinking functionality to the urethane polymer and coating composition. Their function is to temporarily protect isocyanate groups from undesired reactions. The main requirement for the blocking compound is for its reaction with isocyanate to be reversible. When the reaction is reversed, the isocyanate group is regenerated and is available for further reactions after deblocking. The deblocking reaction can be triggered by physical or chemical means, for example, by elevated temperatures, radiation, vacuum, catalysts, compounds with active hydrogen, or combinations thereof. Malonates (such as DEM) are a variation on blocking compounds as they do block isocyanate groups from undesirable reactions such as with water, but when combined with hydroxyl-containing substrates, rather than deblock at higher temperatures during crosslinking, they react at lower temperatures to form a chemical bond with such reactive hydroxyls.

Examples of reactive crosslinking moieties (including blocking agents) include 1,3-dicarbonyl compounds, oximes and other N-hydroxyl compounds, phenols, alcohols, lactams, imidazoles, pyrazoles, acids, mercaptanes, imides, secondary amines, cyanoacetates, malononitrile and its derivatives, and sulfites. The preferred reactive crosslinking agent (including blocking agents) are 1,3-dicarbonyl compounds (dicarbonylmethanes) (U.S. Pat. No. 2,826,526). Examples include acetyl acetone and its derivatives, alkyl acetoacetates, alkoxyalkyl acetoacetates, barbituric acid and its derivatives. The reactive crosslinking moiety may be reacted into the prepolymer and thereafter the polyurethane or it can be a separate isocyanate based compound/moiety (e.g., blocked polyisocyanate moiety or reaction product of a polyisocyanate and a 1,3-dicarbonyl compound) that reacts to crosslink the polyurethane or bind the polyurethane to a substrate.

Oximes are another group of generally preferred blocking agents. Oximes can be represented by a general formula CRR'=NOH, where R and R' may independently be H or $C_nH_{2n+1}$. R and R' may also contain cycloaliphatic, aromatic groups, and groups with heteroatoms including heterocyclic groups. The oxime may be an aldoxime when one or both R and R' are hydrogen, or ketoxime when both R and R' are hydrocarbyl groups desirably alkyl groups having from 1 to 12 carbon atoms. Examples of aldoximes include formaldoxime, acetaldoxime, propionaldoxime, butyraldoxime, benzaldoxime and the like. Examples of ketoximes include acetoxime, butanone oxime, methyl ethyl ketoxime (MEKO), methyl isobutyl ketoxime, cyclopentanoneoxime, cyclohexanone oxime, acetophenone oxime and the like. 1,3-Dicarbonyl compounds and oximes can be used alone or in combination. They can be partially replaced by other blocking agents.

Other blocking agents include lactams, secondary and tertiary alcohols, phenols, pyrazoles, mercaptans, N-hydroxyl compounds and their mixtures. Some specific examples of other suitable blocking agents include triazole, tetrazole, imidazole, caprolactam, phenol and its derivatives such as esters of hydroxybenzoic acids, pyrazole, 3,5-dimethylpyrazole, dibutylamine, diisopropylamine, piperidine, piperazine, tert-butanol, cyclohexanol, isopropanol, glycerine carbonate, N-hydroxysuccinimide, hydroxypyridine, and esters of hydroxamic acid. Combinations of two or more blocking agents are preferred if a stepwise reaction is desired, particularly mixtures of blocking agents which deblock at different temperatures.

The isocyanate blocking reaction can be performed at virtually any stage of the PUD synthesis and is usually carried out at temperatures above 30° C. The reaction times vary and depend on temperature and type and concentration of isocyanate, blocking agent and other ingredients. The blocking reaction can be accelerated by the use of a catalyst. Suitable catalysts include Brönsted base and/or Lewis acid. Examples include the alkali metal alcoholates and phenolates and metal carboxylates.

The deblocking may occur during chain extension or during polymer drying and/or during a separate curing. Often, it is preferred to use a blocking agent, which will evaporate from the polymer during drying or curing. In these cases, low molecular weight blocking agents such as dimethyl malonate, diethyl malonate, acetoxime, butanone oxime, butyraldoxime and the like are preferred.

Blocked isocyanates of the present invention may also be used in combination with other crosslinking chemistries such as summarized in "Functional Latex and Thermoset Latex Films" J. W. Taylor M. A. Winnik J. Coatings Tech., Research, v. 1, No. 3, p. 163 (2004) which is incorporated here by reference. These include melamine-based crosslinkers, metal carboxylates, aziridines, carbodiimides, epoxides, unsaturated compounds, acetoacetoxy- and ketone-functional polymers and additives, enamine and amine crosslinking, isocyanates and self-blocked isocyanates, OH-functional polyesters and acrylates, acid-functional resins, and hydroxyalkylamides.

In one embodiment involving ketone-hydrazine crosslinking, the amount of ketone crosslinkable functional groups in the polymer containing polyamide and multiple urethane and/or multiple urea linkages will be at least 0.05 milliequivalents per gram of said polymer dispersion, or up to about 1 milliequivalent, preferably from about 0.05 to about 0.5 milliequivalent, and more preferably from about 0.1 to about 0.3 milliequivalent per gram of said polymer dispersion. In that embodiment the ketone groups can be on the polymer containing polyamide and multiple urethane and/or multiple urea linkages and/or the polymer from ethylenically unsaturated monomers. In another embodiment, at least 10, 20, 30, 40 or 50 wt. % of said polymer containing polyamide and multiple urethane and/or multiple urea linkages has at least one ketone group chemically bonded to each polyurethane chain of said polyurethane. In another embodiment said polymer containing polyamide and multiple urethane and/or multiple urea linkages in the form of a dispersion further comprises hydrazine and/or hydrazide groups (sometimes in the form of low molecular weight species and sometimes in the form of polymers with hydrazide groups) in an amount from 10 mole % to about 100 or 200 mole % of ketone groups in said polymer containing polyamide and multiple urethane and/or multiple urea linkages in the form of a dispersion. This provides for a ketone chemical reaction with hydrazine forming a chemical bond that can function as chemical crosslinking. Typically, when adding hydrazine for crosslinking one does not use an excess of hydrazine because of potential undesirable reactions of hydrazine on humans. In one embodiment, the amount of hydrazine or hydrazide groups is desirably from about 20 to 100 mole % of the amount of ketone functional groups.

In one embodiment, said hydrazine and/or hydrazide groups are part of a reactive hydrazine or hydrazide compound of less than 400, 300 or 220 g/mole molecular weight (such as adipic acid dihydrazide). In another embodiment, said hydrazide groups are present and said hydrazide groups are part of a hydrazide reactive oligomeric or polymeric chemical compound of 300 or 400 g/mole to 500,000 g/mole molecular weight.

In another embodiment, said polymer from free radically polymerizable monomers comprises on average one or more (more desirably up to about 1 milliequivalent, preferably from about 0.05 to about 0.5 milliequivalent, and more preferably from about 0.1 to about 0.3 milliequivalent per gram of said polymer from free radically polymerizable monomers on a dry polymer weight basis) ketone groups per polymer and said dispersion further comprises hydrazine and/or hydrazide groups in an amount from 10 mole % to about 200 mole % based on the moles of said ketone groups.

The ketone-hydrazine crosslinking described above is well known in the urethane and acrylic polymer dispersion art as effective crosslinkers for polymeric dispersions at around room temperature upon evaporation of volatile base and shift of the solution pH from slightly basic to neutral or pH acid. U.S. Pat. No. 8,901,244 teaches urethanes and related compounds in water crosslinked or increased in molecular weight by ketone-hydrazine crosslinking. This technology is also sometimes known as azomethine linkages.

The polymer containing polyamide and multiple urethane and/or multiple urea linkages in the form of a dispersion may also comprise anionic, nonionic, or zwitterionic surfactants to help colloidally stabilize the dispersion.

Processes

The prepolymer of the polymer containing polyamide and multiple urethane and/or multiple urea linkages of this disclosure are made in accordance with this invention by forming the prepolymer from the reaction of Zerewitinoff reactive groups with polyisocyanates in the substantial absence of water (as water reacts with isocyanate groups) and then dispersing this prepolymer in aqueous medium. This can be done in any of the methods known to the art.

Typically, prepolymer formation will be done by bulk or solution polymerizing the ingredients of the prepolymer.

Once the urethane prepolymer mixture is formed, optionally with dispersing moieties incorporated into said prepolymer/polymer, it is dispersed in an aqueous medium to form a dispersion or a solution. Dispersing the prepolymer in aqueous medium can be done by any conventional technique in the same way that polyurethane prepolymers made by bulk or solution polymerization are dispersed in water. Normally, this will be done by combining the prepolymer blend with aqueous medium with mixing. Where solvent polymerization is employed, the solvent and other volatile components can optionally be distilled off from the final dispersion, if desired. Where the prepolymer includes enough water-dispersibility enhancing compound, e.g., anionic, cationic, and/or nonionic monomers, to form a stable dispersion without added emulsifiers (surfactants), the dispersion can be made without such compounds, i.e., substantially free of surfactants of less than 200 g/mole molecular weight, if desired. The advantage of this approach is that the coatings or other products made from the polymer containing polyamide and multiple urethane and/or multiple urea linkages without low molecular weight surfactants exhibit less water sensitivity, often better film formation and less foaming.

Other known ways of making aqueous polyurethane dispersions can also be used to make the dispersions of this invention. Their review can be found in several publications including by D. Dieterich in *Progress in Organic Coatings*, vol. 9, pp. 281-340 (1981). Examples of the processes include:

Shear Mixing—Dispersing the prepolymer by shear forces with emulsifiers (external emulsifiers, such as surfactants, or internal emulsifiers having anionic, nonionic, cationic and/or zwitterionic groups as part of or pendant to the polymer backbone, and/or as end groups on the polymer backbone).

Acetone process—A prepolymer is formed with or without the presence of acetone, MEK, and/or other polar solvents that are non-reactive with isocyanates and easily distilled. The prepolymer is further diluted in said solvents as necessary, and chain extended with an active hydrogen-containing compound. Water is added to the chain-extended polymer, and the solvents are distilled off. A variation on this process would be to chain extend the prepolymer after its dispersion into aqueous medium.

Melt dispersion process—An isocyanate-terminated prepolymer is formed, and then reacted with an excess of ammonia or urea to form a low molecular weight oligomer having terminal urea or biuret groups. This oligomer is dispersed in aqueous medium and chain extended by methylolation of the biuret groups with formaldehyde.

Ketazine and ketimine processes—Hydrazines or diamines are reacted with ketones to form ketazines or ketimines. These are added to a prepolymer, and remain inert to the isocyanate. As the prepolymer is dispersed in water, the hydrazine or diamine is liberated, and chain extension takes place as the dispersion is taking place.

Continuous process polymerization—An isocyanate-terminated prepolymer is formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer (or neutralized prepolymer), optional neutralizing agent, water, and optional chain extender and/or surfactant.

Reverse feed process—Water and optional neutralizing agent(s) and/or extender amine(s) are charged to the prepolymer under agitation. The prepolymer can be neutralized before water and/or diamine chain extender is added.

Additives and Applications

It may be desirable to include coalescing aids in the prepolymers and polymer containing polyamide and multiple urethane and/or multiple urea linkages in the form of a dispersions of this disclosure to help promote coalescence at the desired temperature of the polymer particles with each other and with any solid additives in the compositions. Coalescing aids can also be known as solvents or plasticizers, depending on their function. One coalescing aid is the free radically polymerizable monomers (vinyl monomers) earlier discussed with composite polymer blends. Preferred vinyl monomers include methyl methacrylate, butyl acrylate, ethylhexyl acrylate, ethyl acrylate and styrene. Coalescing solvents include diethylene glycol dimethyl ether, dipropylene glycol dimethyl ether, dimethylcarbonate, isopropyl alcohol, dibutylene glycol dimethyl ether, and Texanol (isobutyric ester of 2,2,4-trimethyl-1,3-pentanediol).

Neutralization agents can optionally be employed in the dispersions of the invention and the coating compositions prepared from such dispersions. The pH of the compositions can range from about 7 to about 10 if anionically stabilized. Suitable neutralization agents include but are not limited to alkali hydroxides such as lithium, sodium and potassium, and organic bases such as ammonia and tertiary amines such as triethanolamine, aminomethyl propanol, dimethyl ethanol amine, trimethyl amine, triethylamine morpholine, and mixtures thereof.

Crosslinkers

Compounds having at least one crosslinkable functional group can also be incorporated into the polyurea/urethane of the present invention, if desired. Examples of such compounds include those having carboxylic, carbonyl, amine, hydroxyl, epoxy, acetoacetoxy, olefinic and hydrazide groups, blocked isocyanates, and the like, and mixtures of such groups and the same groups in protected forms which can be reversed back into original groups from which they were derived. Other suitable compounds providing crosslink ability include thioglycolic acid, 2,6-dihydroxybenzoic acid, melamine and its derivatives, multivalent metal compounds and the like, and mixtures thereof.

The amount of optional compounds having crosslinkable functional groups in the prepolymer of the polymer containing polyamide and multiple urethane and/or multiple urea linkages will typically be up to about 1 milli-equivalent, preferably from about 0.05 to about 0.5 milli-equivalent, and more preferably from about 0.1 to about 0.3 milli-equivalent per gram of final polymer(s) in the polyurethane dispersion on a dry weight basis.

Other additives well known to those skilled in the art can be used to aid in preparation of the dispersions of this invention. Such additives include surfactants, stabilizers, defoamers, thickeners, leveling agents, antimicrobial agents, antioxidants, UV absorbers, fire retardants, pigments, dyes, and the like. These additives can be added at any stage of the manufacturing process.

The dispersions of this invention typically have total solids of at least about 20 weight percent in one aspect, at least about 30 weight percent in another aspect, and at least about 40 weight percent in a further aspect, and about 45 weight percent in still another aspect, based on the weight of the total coating composition.

As coating compositions or adhesives, they may be applied to any substrate including wood, metals, glass, cloth, leather, paper, plastics, foam and the like, by any conventional method including brushing, dipping, flow coating, spraying, and the like.

The gloss reading on the coatings and films of the current disclosure can be accomplished according to ASTM D523-14. Measurements can be taken at geometry angles of 20, 60, or 85°. Desirably, the gloss values on a 3 mil (0.076 mm) thick coating at 60° is less than 60, more desirably less than 40, and preferably less than 20. Desirably, the haze values is relatively low at such gloss values, such that the haze value is less than 5, more desirably less than 4 or 3, and preferably less than 2. Conventional silica flattening agents with a 60° gloss of 20 would normally generate a haze value above 5 or 10. Gloss is associated with the capacity of a surface to reflect more light in directions close to the specular than in others. Measurements correlate with visual observations of surface shininess made at similar angles. Other visual aspects of surface appearances such as distinctness of reflected images, reflection haze and texture are involved in the assessment of gloss. Desirable substrates for measuring gloss and haze include cold rolled metals (optionally primed), glass plates, polyester films such as Mylar, and Leneta charts (optionally black if haze is to be measured).

The compositions of the present invention and their formulations are useful as self-supporting films, coatings, inks, and adhesives on various substrates with matting or gloss adjusted by the polyamide from the amine repeating units of Formulas I to IV. The compositions of this disclosure are particularly useful on wood and metal coatings where prior art matting agents often add porosity or permeability of the coating by staining materials or substrate damaging or corroding materials such as water. The compositions of the current disclosure are particularly useful in metal coatings use for transportation vehicles and other original equipment manufacturers where low, medium, or high matt finishes can contrast nicely with high gloss finishes in other areas. The compositions of this disclosure are particularly useful on clear or highly transparent substrates where one wants to avoid glare or light reflection onto other surfaces or obstruct/blur identification of objects on the other side of the substrate without reducing total transmitted light through the substrate. These polymer containing polyamide and multiple urethane and/or multiple urea linkages have high light transmission through the coating but with sufficient matting can substantially obstruct/blur objects on the other side of the substrate but still allow substantially all of the incident light to pass through the coating. Other prior art matting agents use mineral additives to adjust matting and these mineral additives have much higher refractive index than this polyamide and thus they reflect back more incident light due to difference in refractive index between the polymer binder and matting agent.

Working Examples

In these examples, the following reagents were used:
H12MDI—1,1'-methylenebis-(4-isocyanato cyclohexane) from Bayer Corporation as Desmodur® W
Hydrogenated dimer acid—DA
Sebacic acid—SA
Dodecanedioic acid—DDA
Caprolactone—CPL
4,4'-Methylenebis(cyclohexylamine)—MHMDA
4,4'-Methylenebis(2-methylcyclohexylamine)—HMDA
1,2-cyclohexanediamine—CHDA
Isophorone diamine—IDA Polyketone diol is the reaction product of 2 moles of levulinic acid with one mole of the diglycidylether of bisphenol A with 0.5-0.7 moles of a diisocyante to effect coupling.

Polycarbonate was Eternacoll PH100, which is an aliphatic polycarbonate sold by UBE believed to be about 1000 g/mole molecular weight diol with repeat units of carbonate with 1,6-hexanediol and 1,5-pentanediol.

DMBA is dimethylolbutanoic acid.

Acrylate is a blend of 70 wt. % methyl methacrylate, 10 wt % ethylene glycol dimethacrylate, and 20 wt. % octylacrylamide.

TEA is triethanolamine.

Hydrazine is $H_2N=NH_2$ and it is usually available as 35% active.

ADH is adipic acid dihydrazide and it usually comes as neat.

Polyketone diol synthesis example. A poly-ketone functional oligomer was prepared by combining items 1-3 of the ingredients below in a 4 neck flask equipped with a thermometer, overhead stirrer and nitrogen gas inlet. With stirring and under a nitrogen blanket, the temperature of the reaction mixture was raised to 100° C. to 103° C. and held at this temperature for 1 hour. The temperature was then raised to 110-114° C. and held there for an additional hour. Finally, the reaction mixture was raised to 121-125° C. and held at this temperature for two hours or until the acid number was <1.0 (mg/g). At this point, item 4 was added as a solvent, followed by the addition of item 5 at 90-94° C. to effect coupling of the previously made oligomer. The temperature was raised back up to 116-120° C. and maintained there until the titrated NCO for the resulting product was <0.1% (or essentially nil). The final material had a slight amber color and a viscosity of ~5,100 cps at 70° C.

| Item # | Material | Parts | MW | Moles |
|---|---|---|---|---|
| 1 | Bisphenol A diglycidyl ether (Epon 828) | 331.4 | 376 | 0.88 |
| 2 | Levulinic Acid | 202.1 | 116 | 1.74 |
| 3 | Triphenyl phosphine (TPP) | 4.0 | | |
| 4 | Benzyl Benzoate | 152.6 | | |
| 5 | 1,6-Hexane Diisocyanate | 73.2 | 168.2 | 0.43 |

Polyamide 1

The 4,4'-methylenebis(cyclohexylamine), hydrogenated dimer acid and the sebacic acid was added to a 2000 mL stirred reactor under nitrogen and heated to 180° C. The monomers were reacted until the acid number of the polymer dropped below 1 (mgKOH/g). The water which formed during the reaction was allowed to evaporate from the reactor and the reactor was placed under vacuum for a short period of time to remove traces of water. Then caprolactone was charged and allowed to react for 6 hours. The final product is a yellowish polyamide oligomer.

Polyamide 2

The 4,4'-methylenebis(2-methylcyclohexylamine), hydrogenated dimer acid and the dodecanedioic acid was added to a 2000 mL stirred reactor under nitrogen and heated to 180° C. The monomers were reacted until the acid number of the polymer dropped below 1 (mgKOH/g). The water which formed during the reaction was allowed to evaporate from the reactor and the reactor was placed under vacuum for a short period of time to remove traces of water. Then caprolactone was charged and allowed to react for 6 hours. The final product is a yellowish polyamide oligomer.

Polyamide 3

The 4,4'-methylenebis(2-methylcyclohexylamine) and caprolactone was added to a 2000 mL stirred reactor under nitrogen and allowed to react at 180° C. for 12 hours in the presence of titanium octoate (titanium(IV) 2-ethylhexyloxide at 200 ppm based on the weight of the reactants) catalyst. The final product is a yellowish polyamide oligomer.

Polyamide 4

The 4,4'-methylenebis(cyclohexylamine), piperazine and dodecanedioic acid was added to a 2000 mL stirred reactor under nitrogen and heated to 180° C. The monomers were reacted until the acid number of the polymer dropped below 1 (mgKOH/g). The water which formed during the reaction was allowed to evaporate from the reactor and the reactor was placed under vacuum for a short period of time to remove traces of water. Then caprolactone was charged and allowed to react for 12 hours in the presence of titanium octoate catalyst. The final product is a yellowish polyamide oligomer.

Polyamide 5

The 4,4'-methylenebis(cyclohexylamine), isophorone diamine and dodecanedioic acid was added to a 2000 mL stirred reactor under nitrogen and heated to 180° C. The monomers were reacted until the acid number of the polymer dropped below 1 (mgKOH/g). The water which formed during the reaction was allowed to evaporate from the reactor and the reactor was placed under vacuum for a short period of time to remove traces of water. Then caprolactone was charged and allowed to react for 12 hours in the presence of titanium octoate catalyst. The final product is a yellowish polyamide oligomer.

Polyamide 6

The 1,2-diaminocyclohexane and dodecanedioic acid were added to a 2000 mL stirred reactor under nitrogen and heated to 180° C. The monomers were reacted until the acid number of the polymer dropped below 1 (mgKOH/g). Then caprolactone was charged and allowed to react for 6 hours. The final product is a yellowish polyamide oligomer.

Waterborne Polyurethane Dispersions

General Procedure for Preparation of Polymer Containing Polyamide and Multiple Urethane and/or Multiple Urea Linkages, Dispersion in Aqueous Medium, and Chain Extension.

The polyamide and the polycarbonate was charged to the reactor and heated to 150° C. and mixed until a homogeneous mixture was obtained. The estimated molecular weight of each polyamide is shown in Table I. The components in each polyamide is shown in Table II. Then the reactor was cooled to 120° C. and Desmodur™ W was charged and reacted for 30 minutes at 100° C. All acrylate monomers were added to the prepolymer and after the reactor became homogeneous the temperature was set to 85° C. and DMBA was charged. The recipe of the dispersions are shown in Table IV. The DMBA was allowed to react until the theoretical NCO was reached then polyketone diol was added. Polyketone diol was allowed to react until theoretical NCO was reached. Triethyl amine was added to the prepolymer and the batch was cooled to 65-75° C. and dispersed into water to form a dispersion with 20-30 wt. % polymer and 70-80 wt. % water. The polyurethane was then chain extended with hydrazine and the acrylic polymerization was initiated by the addition of t-butylhydroperoxide, erythorbic acid and an EDTA-iron complex. 30 minutes after the exotherm of the polymerization the temperature was increased to 50° C. and maintained until all monomers were reacted. The final product is a milk when dispersion which forms a low gloss film.

Molecular Weight of polyamide copolymers of examples 1-6 determined by end-group analysis and mass determination.

TABLE I

Molecula Weight of polyamide copolymers of examples 1-6 determined by end-group analysis and mass determination

| Mn(nominal) | |
| --- | --- |
| 1100 | Polyamide 1 |
| 1100 | Polyamide 2 |
| 1000 | Polyamide 3 |
| 900 | Polyamide 4 |
| 900 | Polyamide 5 |
| 700 | Polyamide 6 |

TABLE II

| Polyamide | 4,4'-Methyl-enebis(cyclo-hexylamine) - MHMDA | 4,4'-Methyl-enebis(2-methylcyclo-hexylamine) - HMDA | 1,2-cyclo-hexane-diamine - CHDA | Isophorone diamine - IDA | Piperazine - PIP | Hydro-genated dimer acid - DA | Sebacic acid - SA | Dodecanedioic acid - DDA | Caprolactone - CPL |
| --- | --- | --- | --- | --- | --- | --- | --- | --- | --- |
| 1 | 419.9 g | | | | | 300.3 g | 113.9g | | 207.4 g |
| 2 | | 442.2 g | | | | 282.3 | | 103.8 g | 207.4 |
| 3 | | 239 | | | | | | | 762.7 |
| 4 | | 289.1 | | | 12.2 g | | | 56.1 | 653.4 |
| 5 | | 199.3 | | 66.7 g | | | | 26.9 g | 713.3 |
| 6 | | | 353.5 g | | | | | 387.7 | 322.2 |

TABLE III

| | Polyamide code | | Dispersion |
| --- | --- | --- | --- |
| Polyamide internal code | Polyamide 1 | Dispersion internal code | Dispersion 1 |
| | Polyamide 2 | | Dispersion 2 |
| | Polyamide 3 | | Dispersion 3 |
| | Polyamide 4 | | Dispersion 4 |
| | Polyamide 5 | | Dispersion 5 |
| | Polyamide 6 | | Dispersion 6 |

TABLE IV

| Dispersion | Polyamide | Polycarbonate | Polyketone diol | Desmodur® W | DMBA | Acrylates | TEA | Water | Hydrazine | ADH |
|---|---|---|---|---|---|---|---|---|---|---|
| 1 | 73.1 g | 73.1 g | 48.1 g | 165.4 g | 20.6 g | 210 g | 15.5 g | 1032 g | 27.3 g | 9.5 g |
| 2 | 324 | 324 | 162 | 649 | 61.9 | 840 | 55.7 | 3780 | 40.5 | 30.4 |
| 3 | 76.6 | 26.5 | 26.5 | 110.6 | 10.3 | 140 | 8.9 | 636 | 17.9 | 5 |
| 4 | 53 | 26.5 | 53 | 111 | 10 | 140 | 8.9 | 636 | 17.9 | 5 |
| 5 | 53 | 26.5 | 53 | 111 | 10 | 140 | 8.9 | 636 | 17.9 | 5 |
| 6 | 52 | 26 | 52 | 113 | 10.3 | 140 | 8.9 | 626 | 17.1 | 4.6 |

Acrylate is a blend of 70 wt. % methyl methacrylate, 10 wt % ethylene glycol dimethacrylate, and 20 wt. % octylacrylamide.

Coatings were made from Dispersions 2-6 and applied on a Leneta chart (black) substrate at about 3 mils (0.003 inches, 0.076 micrometers (conversion 25.4)) thickness and the gloss and haze values were measured according to ASTM D523-14 using a Elcometer 408.

TABLE V

Coatings were made from Dispersions 2-6 and applied on a Leneta chart (black) substrate at about 3 mils (0.003 inches, 0.076 micrometers (conversion 24.4)) thickness and the gloss and haze values were measured according to ASTM-D523-14 using a Elcometer 408.

| Dispersion Sample | Gloss (60) | Haze |
|---|---|---|
| Dispersion 2 | 6.3 | — |
| Dispersion 3 | 18 | 4.6 |
| Dispersion 4 | 15 | 2.1 |
| Dispersion 5 | 7 | 0.8 |
| Dispersion 6 | 12 | 1.5 |

Except in the Examples, or where otherwise indicated, all numerical quantities in this description specifying amounts, reaction conditions, molecular weights, number of carbon atoms, etc., are to be understood as modified by the word "about." Unless otherwise indicated, all percent and formulation values are on a molar basis. Unless otherwise indicated, all molecular weights are number average molecular weights. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent, which may be customarily present in the commercial material, unless otherwise indicated. As used herein, the expression "consisting essentially of" permits the inclusion of substances that do not materially affect the basic and novel characteristics of the composition under consideration. All of the embodiments of the invention described herein are contemplated from and may be read from both an open-ended and inclusive view (i.e., using "comprising of" language) and a closed and exclusive view (i.e., using "consisting of" language). As used herein parentheses are used designate 1) that the something is optionally present such that monomer(s) means monomer or monomers or (meth)acrylate means methacrylate or acrylate, 2) to qualify or further define a previously mentioned term, or 3) to list narrower embodiments.

While certain representative embodiments and details have been shown for the purpose of illustrating the subject invention, it will be apparent to those skilled in this art that various changes and modifications can be made therein without departing from the scope of the subject invention.

What is claimed is:

1. A colloidally stabilized polymer dispersion in an aqueous medium, said polymer containing a polyamide oligomer and multiple urethane linkages and/or multiple urea linkages, said dispersion in aqueous medium comprising
   a) a polyamide oligomer having amine repeating units selected from

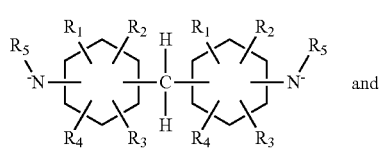

Formula I

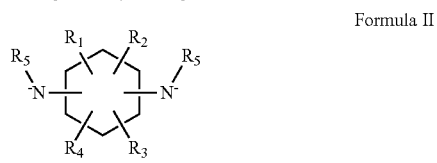

Formula II wherein $R_1$ to $R_5$ are independently selected from H or a $C_1$ to $C_4$ linear or branched alkyl group, wherein the nitrogen terminal groups of said amine repeating units are reacted with reactive carbonyl repeating units having at least one carbonyl group capable of forming an amide linkage;
   b) at least one repeating unit from a polyisocyanate reacted with a hydroxyl or amine group; and
   c) a water dispersible group reacted into said polymer containing polyamide and multiple urethane and/or multiple urea linkages;
   further wherein said amine repeating units are a portion of said polymer containing polyamide and multiple urethane and/or urea linkages and said amine repeating units are from about 4 to about 15 wt. % of said polymer containing polyamide and multiple urethane and/or multiple urea linkages; and
   further wherein said polymer dispersion further comprises unsaturated free radically polymerizable monomeric reactants or polymeric species derived from said unsaturated free radically polymerizable monomeric reactants in an amount from about 10 to about 50 wt. % based on the total weight of polymer in said dispersion.

2. The polymer dispersion in aqueous medium according to claim 1, wherein said polyamide oligomer on average has from about 1 to about 10 total of said amine repeating units of Formula I or Formula II per polymer chain.

3. The polymer dispersion in aqueous medium according to claim 1, wherein at least one of said amine repeating groups of said polyamide oligomer is connected to a) repeating units of the formula —(C(=O)—$R_e$—C(=O)— derived from a dicarboxylic in an alternating sequence, wherein $R_e$ is a $C_3$ to $C_{48}$ or 58 linear or branched alkylene group; b) repeating units of the formula —(C(═O)—$R_f$—O—)— wherein $R_f$ is a $C_1$ to $C_{14}$ linear or branched alkylene group, or c) combinations thereof.

4. The polymer dispersion according to claim 3, wherein the polyamide oligomer is further reacted with a cyclic lactone or hydroxycarboxylic acid of 2 to 15 carbon atoms to chain extend the polyamide oligomer with polyester repeating units, wherein said polyester repeating units are from 1 to 75 wt. % of said polymer containing polyamide and multiple urethane linkages and/or urea linkages.

5. The polymer dispersion according to claim 1, wherein said polymer further comprises a) one or more polyester segment, b) one or more polycarbonate segment, c) one or more polyether segment, or d) blends thereof chemically bound into said polymer or physically blended with said polymer of said dispersion, wherein said polyester, polycarbonate, or polyether segment, or blends thereof comprise from about 2 to about 50 wt. % of the total polymer weight of said polymer dispersion.

6. The polymer dispersion of claim 5, wherein said polymer comprises polycarbonate segments of 500 to 5,000 g/mole molecular weight present in an amount from about 2 to about 50 wt. % of the total polymer weight of said polymer containing polyamide and multiple urethane and/or multiple urea linkages of said dispersion.

7. The polymer dispersion according to claim 1 further comprising a crosslinking agent or crosslinkable group that facilitates crosslinking built into the polymer.

8. The polymer dispersion according to claim 1, wherein said water dispersible group comprises an anionic water dispersing covalently bound into or synthesized into said at least one polymer of said polymer dispersion.

9. The polymer dispersion in aqueous medium according to claim 1, wherein said water dispersible group is selected from the group of anionic, cationic, nonionic, or blends thereof.

10. The polymer dispersion according to claim 9, wherein said anionic water dispersing group comprises a carboxylic acid present at an acid number from about 5 to about 40 mg KOH/g of polymer.

11. The polymer dispersion according to claim 9, wherein said water dispersible group comprises a nonionic oligomer covalently bound into or synthesized into said at least one polyurethane of said polymer dispersion.

12. The polymer dispersion according to claim 9, wherein said water dispersible group comprises a cationic water dispersing groups.

13. The polymer dispersion according claim 1 formed into a self-supporting film, coating, or adhesive.

14. The polymer dispersion according to claim 13 converted into a self-supporting film or coating on a substrate by forming into the appropriate shape and evaporating the aqueous medium; said film or coating having a gloss reading at 60° of less than 20 using for a film or coating thickness of 3 mils according to ASTM D523-14 using an elcometer 408.

15. The polymer dispersion according to claim 14 in the form of a coating on a substrate wherein said substrate is a metal, wood, clear plastic, or clear glass.

16. The polymer dispersion according to claim 1, wherein at least 80 mole percent of the $R_5$ groups of said amine repeating units are H.

17. A colloidally stabilized polymer dispersion in an aqueous medium, said polymer containing a polyamide oligomer and multiple urethane linkages and/or multiple urea linkages, said dispersion in aqueous medium comprising
a) a polyamide oligomer having amine repeating units selected from

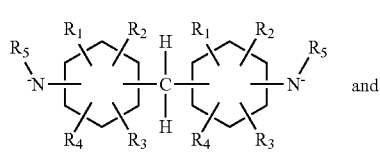

Formula I

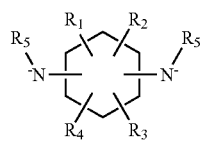

Formula II wherein $R_1$ to $R_5$ are independently selected from H or a $C_1$ to $C_4$ linear or branched alkyl group, wherein the nitrogen terminal groups of said amine repeating units are reacted with reactive carbonyl repeating units having at least one carbonyl group capable of forming an amide linkage;
b) at least one repeating unit from a polyisocyanate reacted with a hydroxyl or amine group; and
c) a water dispersible group reacted into said polymer containing polyamide and multiple urethane and/or multiple urea linkages;
further wherein said amine repeating units are a portion of said polymer containing polyamide and multiple urethane and/or urea linkages and said amine repeating units are from about 4 to about 15 wt. % of said polymer containing polyamide and multiple urethane and/or multiple urea linkages;
further comprising at least 10 wt. % of a second polymer based on the total weight of polymers in said polymer containing polyamide and multiple urethane linkages and/or multiple urea linkages in the form of a dispersion, said second polymer having less than 4 wt. % of amine repeating units of Formula I and Formula II; and
wherein said second polymer is a polymer formed from free radically polymerizing unsaturated monomer(s).

18. The polymer dispersion according to claim 17, wherein at least 50 wt. % of said second polymer exists in separate dispersed polymer particles in the aqueous phase and at least 50 wt. % of said separate dispersed polymer particles contain less than 4 wt. % of combined amine repeating units of Formula I and Formula II.

19. The polymer dispersion according to claim 17, wherein at least 50 wt. % of said second polymer co-exists in polymer particles with said polymer containing polyamide and multiple urethane and/or multiple urea linkages, said polymer containing polyamide and multiple urethane linkages and/or multiple urea linkages being characterized by having from about 4 to about 15 wt. % of amine repeating units of Formula I and/or Formula II.

20. The polymer dispersion according to claim 17, wherein said second polymer is a polyurethane polymer.

21. The polymer dispersion in aqueous medium according to claim 17, wherein said polyamide oligomer on average has from about 1 to about 10 total of said amine repeating units of Formula I or Formula II per polymer chain.

22. The polymer dispersion in aqueous medium according to claim 17, wherein at least one of said amine repeating groups of said polyamide oligomer is connected to a) repeating units of the formula —(C(=O)—R$_e$—C(=O)— derived from a dicarboxylic in an alternating sequence, wherein R$_e$ is a C$_3$ to C$_{48}$ or 58 linear or branched alkylene group; b) repeating units of the formula —(C(=O)—R$_f$—O—)— wherein R$_f$ is a C$_1$ to C$_{14}$ linear or branched alkylene group, or c) combinations thereof.

23. The polymer dispersion according to claim 22, wherein the polyamide oligomer is further reacted with a cyclic lactone or hydroxycarboxylic acid of 2 to 15 carbon atoms to chain extend the polyamide oligomer with polyester repeating units, wherein said polyester repeating units are from 1 to 75 wt. % of said polymer containing polyamide and multiple urethane linkages and/or urea linkages.

24. The polymer dispersion according to claim 17, wherein said polymer further comprises a) one or more polyester segment, b) one or more polycarbonate segment, c) one or more polyether segment, or d) blends thereof chemically bound into said polymer or physically blended with said polymer of said dispersion, wherein said polyester, polycarbonate, or polyether segment, or blends thereof comprise from about 2 to about 50 wt. % of the total polymer weight of said polymer dispersion.

25. The polymer dispersion of claim 24, wherein said polymer comprises polycarbonate segments of 500 to 5,000 g/mole molecular weight present in an amount from about 2 to about 50 wt. % of the total polymer weight of said polymer containing polyamide and multiple urethane and/or multiple urea linkages of said dispersion.

26. The polymer dispersion according to claim 17 further comprising a crosslinking agent or crosslinkable group that facilitates crosslinking built into the polymer.

27. The polymer dispersion according to claim 17, wherein said water dispersing group is an anionic water dispersing group and said anionic water dispersing group comprises a carboxylic acid present at an acid number from about 5 to about 40 mg KOH/g of polymer.

28. The polymer dispersion according to claim 17, wherein said water dispersible group comprises a cationic water dispersible group.

29. The polymer dispersion according to claim 17, wherein at least 80 mole percent of the R$_5$ groups of said amine repeating units are H.

30. The polymer dispersion according claim 17 formed into a self-supporting film, coating, or adhesive.

31. The polymer dispersion according to claim 30 converted into a self-supporting film or coating on a substrate by forming into the appropriate shape and evaporating the aqueous medium; said film or coating having a gloss reading at 60° of less than 20 using for a film or coating thickness of 3 mils according to ASTM D523-14 using an elcometer 408.

32. The polymer dispersion according to claim 31 in the form of a coating on a substrate wherein said substrate is a metal, wood, clear plastic, or clear glass.

33. A colloidally stabilized polymer dispersion in an aqueous medium, said polymer containing a polyamide oligomer and multiple urethane linkages and/or multiple urea linkages, said dispersion in aqueous medium comprising a) a polyamide oligomer having amine repeating units selected from

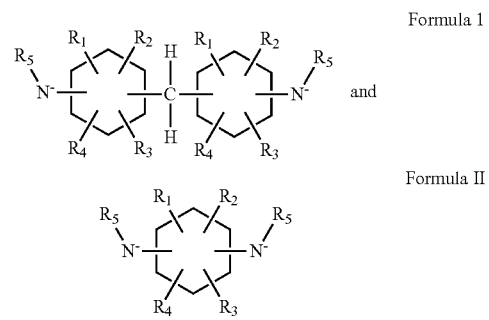

wherein R$_1$ to R$_5$ are independently selected from H or a C$_1$ to C$_4$ linear or branched alkyl group, wherein the nitrogen terminal groups of said amine repeating units are reacted with reactive carbonyl repeating units having at least one carbonyl group capable of forming an amide linkage;

b) at least one repeating unit from a polyisocyanate reacted with a hydroxyl or amine group; and c) a water dispersible group reacted into said polymer containing polyamide and multiple urethane and/or multiple urea linkages;

further wherein said amine repeating units are a portion of said polymer containing polyamide and multiple urethane and/or urea linkages and said amine repeating units are from about 4 to about 15 wt. % of said polymer containing polyamide and multiple urethane and/or multiple urea linkages;

further comprising at least 5 wt. % of polyamide having tertiary amide repeating units of the structure

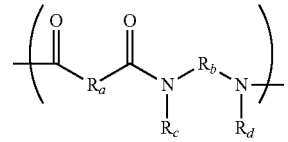

wherein R$_a$ is the alkylene portion of the dicarboxylic acid and is a cyclic, linear, or branched alkylene of 2 to 58 carbon atoms, and wherein R$_b$ is a linear or branched alkylene group of 2 to 60 carbon atoms and R$_c$ and R$_d$ are individually a linear or branched alkyl group of 1 to 8 carbon atoms, or R$_c$ and R$_d$ connect together to form a single linear or branched alkylene group of 1 to 8 carbon atoms.

34. The polymer dispersion in aqueous medium according to claim 33, wherein at least 60 mole % of the repeating units of the tertiary amide structure, said repeating units having the structure

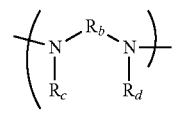

are cyclic tertiary amide repeating units where R$_b$ has from 2 to 6 carbon atoms and R$_c$ and R$_d$ connect together to be a linear or branched alkylene group of 1 to 4 carbon atoms.

* * * * *